United States Patent [19]
Matsuki et al.

[11] Patent Number: 6,114,472
[45] Date of Patent: Sep. 5, 2000

[54] THERMOPLASTIC RESIN COMPOSITION CONTAINING AMORPHOUS POLYIMIDE

[75] Inventors: Toshitsugu Matsuki; Masaaki Tsukioka; Jiro Sadanobu, all of Iwakuni, Japan

[73] Assignee: Teijin Limited, Osaka, Japan

[21] Appl. No.: 09/117,262

[22] PCT Filed: Nov. 21, 1997

[86] PCT No.: PCT/JP97/04260

§ 371 Date: Jul. 27, 1998

§ 102(e) Date: Jul. 27, 1998

[87] PCT Pub. No.: WO98/23682

PCT Pub. Date: Jun. 4, 1998

[30] Foreign Application Priority Data

Nov. 25, 1996 [JP] Japan .................................. 8-313579
May 28, 1997 [JP] Japan .................................. 9-138662

[51] Int. Cl.[7] .................................................... C08L 79/08
[52] U.S. Cl. ............................................ 525/425; 525/436
[58] Field of Search .................................... 525/425, 436

[56] References Cited

U.S. PATENT DOCUMENTS

| | | | |
|---|---|---|---|
| 3,936,404 | 2/1976 | Ishizuka et al. | 525/525 |
| 4,141,927 | 2/1979 | White | 525/425 |
| 5,037,946 | 8/1991 | Morris | 528/272 |
| 5,057,595 | 10/1991 | Morris | 528/272 |
| 5,270,096 | 12/1993 | Kato | 428/143 |
| 5,280,101 | 1/1994 | Koning | 528/229 |
| 5,312,866 | 5/1994 | Tsutsumi | 524/600 |
| 5,439,987 | 8/1995 | Scott et al. | 525/425 |
| 5,514,748 | 5/1996 | Isutsumi et al. | 524/600 |
| 5,516,837 | 5/1996 | Tsutsumi et al. | 524/600 |
| 5,599,658 | 2/1997 | Greener | 430/533 |
| 5,648,433 | 7/1997 | Scott | 525/425 |

FOREIGN PATENT DOCUMENTS

| | | |
|---|---|---|
| 0 522 649 A1 | 1/1993 | European Pat. Off. . |
| 0 594 386 A1 | 4/1994 | European Pat. Off. . |
| 46-26181 | 7/1971 | Japan . |
| 51-143060 | 12/1976 | Japan . |
| 59-37161 | 9/1984 | Japan . |
| 2-199176 | 8/1990 | Japan . |
| 4-1237 | 1/1992 | Japan . |
| 4-175373 | 6/1992 | Japan . |
| 6-49206 | 2/1994 | Japan . |
| 7-228761 | 8/1995 | Japan . |
| 9-179242 | 7/1997 | Japan . |

OTHER PUBLICATIONS

Disclosed Anonymously, 28338, Poly(Ethylene Naphtalene-dicarboxylate)/Polyetherimed Blends, LE8828G, 87–2375–820, Research Disclosure, Nov. 1987, pp. 677–678.

*Primary Examiner*—Ana Woodward
*Attorney, Agent, or Firm*—Sughrue, Mion, Zinn, Macpeak & Seas, PLLC

[57] ABSTRACT

A thermoplastic resin composition comprising an aromatic polyester and an amorphous polyimide. There is provided, for example, a polyalkylene naphthalate resin composition having greatly improved moldability and enhanced crystallinity, and being free from troubles such as bleeding out after molded. The resin composition further exhibits reduced emission of fluorescence and excellent weatherability and delamination resistance.

15 Claims, No Drawings

THERMOPLASTIC RESIN COMPOSITION CONTAINING AMORPHOUS POLYIMIDE

TECHNICAL FIELD

This invention relates to a thermoplastic resin composition comprising an aromatic polyester and an amorphous polyimide. More specifically, it relates to a thermoplastic resin composition comprising an aromatic polyester and an amorphous polyimide and having excellent moldability.

BACKGROUND TECHNOLOGY

Polyethylene terephthalate is used as a raw material for containers for juice, refreshing drink, carbonate drink, seasoning, detergent, cosmetic and the like, since it is excellent in mechanical strength, heat resistance, transparency and gas-barrier properties, as compared with other plastic materials. In some applications, however, it has such problems that it cannot be filled or fully sterilized at high temperatures due to the lack of sufficient resistance to high heat, that it shows low efficiency because of its low alkali washing temperature for recycling use, and that the amount of the content decreases due to its insufficient gas-barrier properties. Therefore, the development of polyethylene terephthalate having excellent heat resistance and high gas-barrier properties has been strongly desired.

Polyethylene-2,6-naphthalene dicarboxylate (to be abbreviated as PEN hereinafter) is widely used as a raw material for magnetic films, drink bottles, packing materials and a variety of moldings. However, since a conventional resin containing a naphthalene ring such as PEN has a low crystallization speed, it is desired to improve crystallization speed for the acceleration of its molding cycle and to rise crystallinity for the improvement of its dimensional stability, chemical resistance and heat resistance. As solutions for these problems, there have been proposed many methods including one which uses a high-temperature mold and one in which a crystal nucleating agent or crystallization promoting agent is added.

Japanese Laid-Open Patent Application 51-143060 discloses a polyether imide/polyester mixture containing a polyether imide represented by the following formula (A):

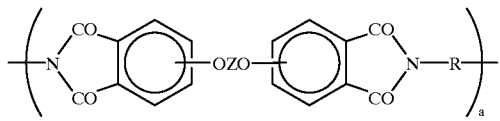

wherein a is a number larger than 1, Z is an o-phenylene group, p-phenylene group or aromatic group having up to 17 carbon atoms, and R is a divalent organic group such as an aromatic hydrocarbon having 6 to 20 carbon atoms, and a polyester represented by the following formula (B):

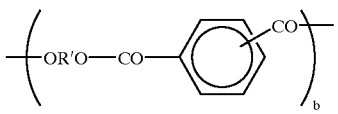

wherein b is a number larger than 1, R' is an alkylene group having 1 to 10 carbon atoms, and two carbonyl groups are at the meta- or para-position.

This mixture exhibits a lower melt viscosity than that of the polyether imide.

Japanese Laid-Open Patent Application 59-37161 discloses a heat resistant polyester container made of an unoriented amorphous sheet formed from a resin composition comprising 60 to 99 wt % of a polyethylene terephthalate and 40 to 1 wt % of a polyether imide. This publication discloses the same polyether imide as that represented by the above formula (A) disclosed by the above Japanese Laid-Open Patent Application 51-143060.

Japanese Laid-Open Patent Application 6-49206 discloses a polyimide comprising 3,3',4,4'-benzophenone tetracarboxylic dianhydride as a monomer unit and 1,4-diaminobutane as a monomer unit and a polymer blend of the polyimide and a thermoplastic polymer including polyethylene terephthalate or polybutylene terephthalate. Example III shows that the melting point of a polyimide obtained from 3,3',4,4'-benzophenone tetracarboxylic anhydride and diamine consisting of 75% of 1,4-diaminobutane and 25% of 3,3-oxydianiline could not be detected, while polyimides in other examples are crystalline polyimides having a melting point.

On pages 677 and 678 of Research Disclosure November 1987 and pages 1453 to 1458 of ANTEC' 95 is disclosed a blend of a polyether imide (ULTEM1000 of GE Corp.) comprising recurring units represented by the following formula and polyethylene-2,6-naphthalene dicarboxylate (PEN).

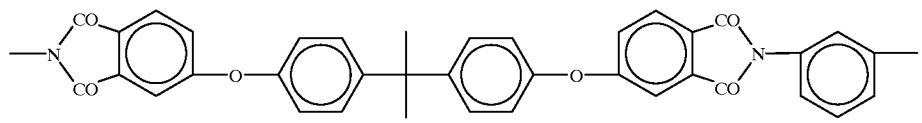

Although the glass transition temperature of this blend is improved due to the high glass transition temperature of the ULTEM1000, it is difficult to mold the blend due to its increased melt viscosity. In addition, the obtained molded article is fragile, and its delamination which occurs when a film is bent to undergo stress is not improved.

Japanese Laid-Open Patent Application 7-228761 discloses a polyester resin composition comprising a copolyester consisting of ethylene terephthalate units and ethylene naphthalate units and the polyether imide substantially same as that represented by the above formula (A). The publication also discloses that this resin composition is used in exterior trim parts such as auto parts, or in housings for office equipment, or the like.

U.S. Pat. No. 5,057,595 discloses a composition comprising a copolyester comprising 4,4'-biphenyldicarboxylic acid as an acid component and 1,4-cyclohexane dimethanol and ethylene glycol as glycol components and a modifier such as a composition containing ULTEM of GE Corp.

U.S. Pat. No. 5,037,946 discloses a composition comprising a copolyester comprising 4,4'-biphenyldicarboxylic acid as an acid component and 1,6-hexanediol and ethylene glycol as glycol components and the same modifier as described above.

DISCLOSURE OF THE INVENTION

It is an object of the present invention to provide a thermoplastic resin composition containing an amorphous polyimide.

It is another object of the present invention to provide a thermoplastic resin composition which contains an amorphous polyimide and has excellent moldability.

It is still another object of the present invention to provide a thermoplastic resin composition which contains an amorphous polyimide, is excellent in transparency and delamination resistance, and comprises polyethylene-2,6-naphthalene dicarboxylate or the like as a thermoplastic resin.

It is still another object of the present invention to provide a thermoplastic resin which contains an amorphous polyimide, exhibits excellent heat resistance, and comprises polyethylene terephthalate or the like as a thermoplastic resin.

Other objects and advantages of the present invention will become apparent from the following description.

According to the present invention, the above objects and advantages of the present invention can be attained by a thermoplastic resin composition which comprises an aromatic polyester containing an aromatic dicarboxylic acid as a main acid component and an aliphatic glycol having 2 to 8 carbon atoms as a main diol component and an amorphous polyimide comprising recurring units represented by the following formula (1):

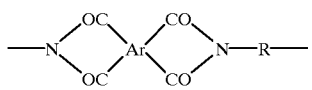

(1)

wherein Ar is an aromatic group having 6 to 15 carbon atoms and R is an aliphatic group having 6 to 30 carbon atoms or alicyclic group having 4 to 30 carbon atoms, and which contains 5 to 99.95 wt % of the aromatic polyester and 0.05 to 95 wt % of the amorphous polyimide, based on the total weight of the aromatic polyester and the amorphous polyimide.

The aromatic polyester used in the present invention contains an aromatic dicarboxylic acid as a main acid component and an aliphatic glycol having 2 to 8 carbon atoms as a main diol component.

The aromatic dicarboxylic acid in the present invention is preferably contained in an amount of 80 to 100 mol %, more preferably 90 to 100 mol %, particularly preferably 95 to 100 mol %, based on the acid components of the aromatic polyester. The aliphatic glycol having 2 to 8 carbon atoms is preferably contained in an amount of 80 to 100 mol %, more preferably 90 to 100 mol %, particularly preferably 95 to 100 mol %, based on the diol components of the aromatic polyester.

Preferred examples of the aromatic dicarboxylic acid include terephthalic acid, isophthalic acid, 2,6-naphthalenedicarboxylic acid, diphenyldicarboxylic acid, diphenoxyethane dicarboxylic acid, diphenylether dicarboxylic acid, diphenylsulfone dicarboxylic acid or the like. These aromatic dicarboxylic acids may be used alone or in combination of two or more.

Illustrative examples of other acid components which may be used in combination with the aromatic dicarboxylic acid in an amount of 20 mol % or less include alicyclic dicarboxylic acids such as hexahydroterephthalic acid and hexahydroisophthalic acid; aliphatic dicarboxylic acids such as adipic acid, sebacic acid and azelaic acid; and oxyacids such as p-β-hydroxyethoxybenzoic acid and ε-oxycaproic acid.

The aromatic dicarboxylic acid is preferably terephthalic acid or 2,6-naphthalenedicarboxylic acid.

The aliphatic glycol having 2 to 8 carbon atoms may be either straight-chain or branched. Illustrative examples of the aliphatic glycol include ethylene glycol, trimethylene glycol, tetramethylene glycol, hexamethylene glycol, decamethylene glycol, neopentyl glycol, diethylene glycol, 1,1-cyclohexanedimethanol, 1,4-cyclohexanedimethanol and the like. These aliphatic glycols may be used alone or in combination of two or more.

Illustrative examples of other diol components which may be used in combination with the aliphatic glycol having 2 to 8 carbon atom in an amount of 20 mol % or less include 2,2-bis(4'-β-hydroxyphenyl)propane, bis(4'-β-hydroxyethoxyphenyl)sulfonic acid or the like.

The aliphatic glycol having 2 to 8 carbon atoms is particularly preferably ethylene glycol.

Illustrative examples of the aromatic polyester include polyethylene terephthalate, polybutylene terephthalate, polyethylene-2,6-naphthalene dicarboxylate, polybutylene-2,6-naphthalene dicarboxylate and copolymers thereof. Of these, polyethylene-2,6-naphthalene dicarboxylate is preferred.

The aromatic polyester preferably has an intrinsic viscosity (dl/g), measured at 35° C. in a phenol/tetrachloroethane mixture solvent (weight ratio 60/40), of 0.3 or more. When the intrinsic viscosity is less than 0.3, the strength of the molded article obtained from the aromatic polyester is apt to be insufficient undesirably. The intrinsic viscosity is more preferably 0.4 or more, particularly preferably 0.5 or more. Although there is particularly no upper limit of intrinsic viscosity, an intrinsic viscosity of ca. 5 suffices for practical use.

The amorphous polyimide which is the other component used in the present invention comprises recurring units represented by the above formula (1). The term "amorphous" means that a distinctive melting peak cannot be detected when measured with a differential scanning calorimeter (DSC). Such polyimide is generally a transparent resin.

In the above formula (1), Ar is an aromatic group having 6 to 15 carbon atoms, and R is an aliphatic group having 6 to 30 carbon atoms or an alicyclic group having 4 to 30 carbon atoms.

Illustrative examples of the aromatic group represented by Ar include:

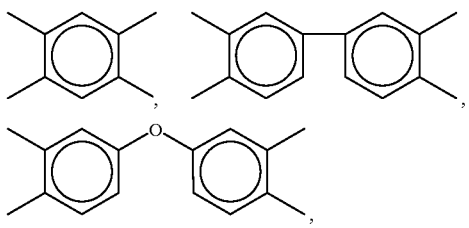

-continued

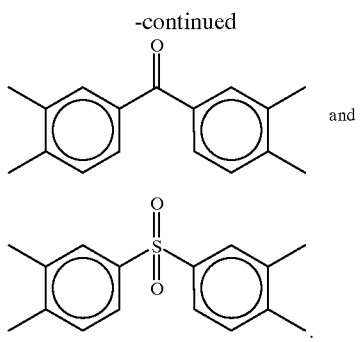
and

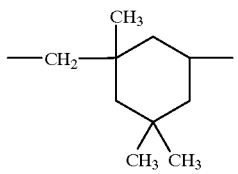

They may be present in the polymer chain alone or in combination of two or more.

Of these, Ar is particularly preferably

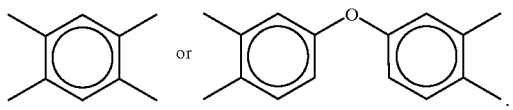

The aliphatic group having 6 to 30 carbon atoms, represented by R, is preferably an aliphatic group having 6 to 12 carbon atoms, and the alicyclic group having 4 to 30 carbon atoms is preferably an alicyclic group having 6 to 12 carbon atoms.

Preferred examples of the group R include $-(CH_2)_m-$ (wherein m is 6 to 12), 2,2,4-trimethylhexamethylene, 2,4,4-trimethylhexamethylene and They may be present in the polymer chain alone or in combination of two or more.

The R in the formula (1) may contain an aliphatic group having 5 or less carbon atoms in an amount of less than 50 mol %, preferably 30 mol % or less, more preferably 20 mol % or less, based on the total of R in the formula 1.

Further, the amorphous properties of the polyimide are enhanced and its compatibility with the aromatic polyester is improved advantageously, when a straight-chain aliphatic group having no side chain (such as a methyl group or the like), such as 1,12-dodecanediamine or the like, is used as the aliphatic group having 6 to 30 carbon atoms, represented by R, in combination of an aliphatic group other than straight-chain aliphatic groups (such as an aliphatic group having a side chain, e.g., a methyl group) or an alicyclic group having 4 to 30 carbon atoms.

Illustrative examples of the recurring unit represented by the above formula (1) preferably include

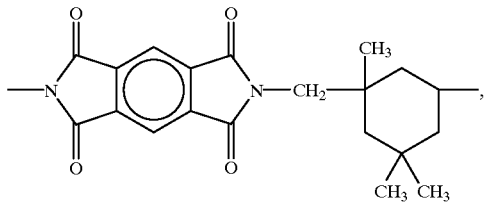

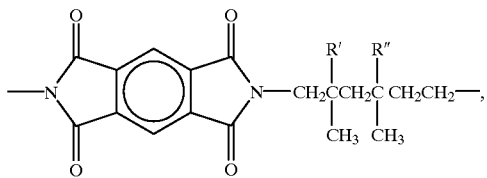

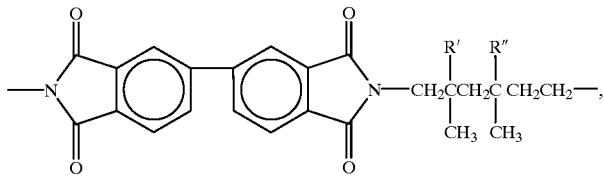

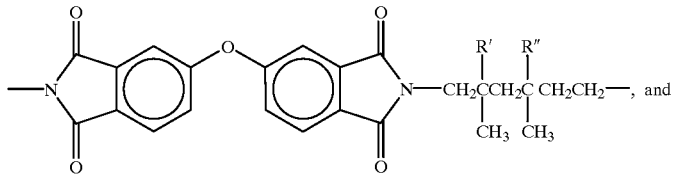

-continued

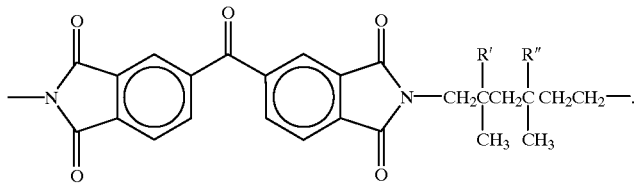

wherein one of R' and R" is a hydrogen atom and the other is a methyl group.

They may be present in the polymer chain alone or in combination of two or more. A combination consists essentially of the above fourth recurring unit, that is, a recurring unit represented by the following formula:

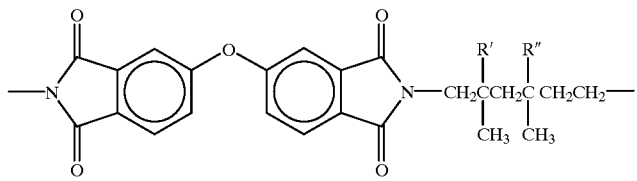

wherein R' and R" are the same as defined in the above formula,
and a recurring unit represented by the following formula:

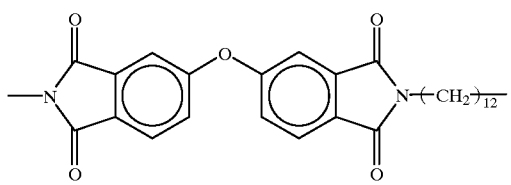

is also preferred.

The above amorphous polyimide can be produced by known methods per se. The methods include, for example, (1) one in which a polyamide acid is first obtained from starting materials tetracarboxylic dianhydride capable of deriving the above Ar and diamine capable of deriving the above R, and its ring is closed either by heating or chemically using a chemical dehydrating agent such as a combination of acetic anhydride and pyridine, carbodiimide or triphenyl phosphite; (2) one in which polymerization is carried out by heating the above tetracarboxylic dianhydride and diisocyanate capable of deriving the above R to cause decarbonation; (3) one in which tetracarboxylic dianhydride is, as an intermediate step, partially or wholly esterified with a lower alcohol such as methanol or ethanol, converted into acid chloride with thionyl chloride, chlorine or phosphor pentachloride, allowed to react with the diamine, and subjected to a cyclization reaction; and the like.

Illustrative examples of the tetracarboxylic dianhydride used in the above methods include pyromellitic dianhydride, benzophenone-3,3',4,4'-tetracarboxylic dianhydride, biphenyl-3,3',4,4'-tetracarboxylic dianhydride, biphenylether-3,3',4,4'-tetracarboxylic dianhydride and diphenylsulfone-3,3',4,4'-tetracarboxylic dianhydride.

Illustrative examples of the diamine include isophorone diamine, cyclohexanediamine, 1,8-diamino-p-menthane, 2,2,4- or 2,4,4-trimethyl hexamethylenediamine, hexamethylenediamine, octamethylenediamine, nonamethylenediamine, decamethylenediamine, undecamethylenediamine, dodecamethylenediamine and the like.

The molecular weight of the amorphous polyimide in the present invention is not particularly limited. When the amount of the amorphous polyimide added is small, an amorphous polyimide having a low molecular weight may be used as far as it does not impair the mechanical properties of the obtained molded article, whereas when its amount is large, use of a polyimide having a high molecular weight is preferred to such an extent that it does not impair moldability. In general, when the amorphous polyimide dissolves in a phenol/tetrachloroethane mixture solvent (weight ratio 60/40), it preferably has an intrinsic viscosity measured at 35° C. of 0.10 or more, more preferably 0.15 or more, particularly preferably 0.25 or more. Although there is no upper limit of intrinsic viscosity, an intrinsic viscosity of ca. 5 suffices for practical use.

The thermoplastic resin composition of the present invention comprises 5 to 99.95 wt %, preferably 40 to 95 wt %, of an aromatic polyester and 0.05 to 95 wt %, preferably 5 to 60 wt %, of an amorphous polyimide, based on the total weight of the aromatic polyester and the amorphous polyimide. More preferably, the aromatic polyester is contained in an amount of 50 to 90 wt % and the amorphous polyimide in an amount of 10 to 50 wt %, based on the total weight of the aromatic polyester and the amorphous polyimide.

Further, when the aromatic polyester is a polyester comprising 2,6-naphthalenedicarboxylic acid as a main acid component and ethylene glycol as a main diol component, the aromatic polyester can be contained in an amount of 80 to 99.95 wt % and the amorphous polyimide in an amount of 0.05 to 20 wt %, based on the total weight of the aromatic polyester and the amorphous polyimide. The resin composition containing such a small amount of the amorphous polyimide can suppress the fluorescent color inherent in the aromatic polyester.

In the amorphous polyamide used in the present invention, it is preferable for the improvement of moldability and crystallinity that a difference between Tg of the polyimide and Tg of the aromatic polyester is large. When polyethylene-2,6-naphthalene dicarboxylate is used as the aromatic polyester, the difference is preferably 100° C. or lower, more preferably 40° C. or lower for the improvement of delamination resistance.

Since the amorphous polyimide used in the present invention generally has excellent compatibility with an aromatic polyester, the thermoplastic resin composition of the present invention can exhibit a single peak derived from glass transition temperature measured at a temperature elevation rate of 20° C./min by DSC.

To produce the resin composition of the present invention, a method in which an aromatic polyester and an amorphous polyimide are mixed together using a twin-screw extruder is preferably employed. The mixing temperature must be a temperature at which the decomposition of a polymer does not take place and which is higher than the melting point of the aromatic polyester. Mixing is substantially impossible to conduct at a temperature lower than the melting point of the aromatic polyester. Further, the mixing temperature is preferably higher than the glass transition temperature of the amorphous polyimide. For example, when the aromatic polyester is poly(1,2-ethylene-2,6-naphthalene dicarboxylate), the mixing temperature is preferably 280 to 290° C.

The amorphous polyimide may be directly added to the aromatic polyester. Alternatively, it may be first dissolved in the aromatic polyester in a high concentration to prepare a master polymer in advance and this master polymer may be diluted with the aromatic polyester. The master polymer can be prepared by mixing together the aromatic polyester and the amorphous polyimide directly, or by dissolving the amorphous polyimide and the aromatic polyester in a solvent that can dissolve both and then removing the solvent by distillation. The solvent is preferably a low molecular weight imide compound having either one of the following structures:

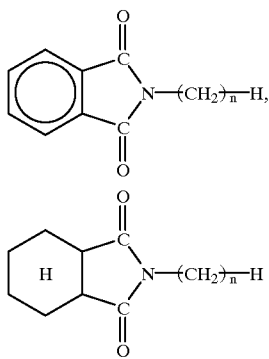

wherein n is an integer of 1 to 6.

The resin composition of the present invention can contain various additives as required. The additives include a fiber reinforcement such as a glass fiber, metal fiber, aramide fiber, ceramic fiber, potassium titanate whisker, carbon fiber or asbestos; a filler such as talc, calcium carbonate, mica, clay, titanium oxide, aluminum oxide, glass flake, milled fiber, metal flake or metal powder; a thermal stabilizer or oxidative stabilizer typified by phosphate or phosphate; optical stabilizer; ultraviolet absorber; lubricant; pigment; flame retardant; flame retardant aid; plasticizer; crystal nucleating agent; and the like.

The resin composition of the present invention is of great industrial value because it can be developed into fibers, films, and molded articles such as various packing materials, drink bottles, containers, tubes, films, covers and casings by making use of excellent properties of polyalkylene naphthalate and polyimide. Particularly, the resin composition is very promising and of great value in that the resin composition is developed into a refillable drink bottle which can be fully sterilized at high temperatures and filled at high temperatures for recycle use by making use of its heat resistance.

EXAMPLES

The following examples are given to further illustrate the present invention, while the present invention shall not be limited thereto. In the following examples, "parts" means "parts by weight", and the intrinsic viscosity (dl/g) of a polymer is a value measured at 35° C. in a phenol/tetrachloroethane mixture solvent (a weight ratio: 60/40).

Reference Example 1 (synthesis of polyimide (PIPM))

In a nitrogen atmosphere, 131.5 gram of isophorone diisocyanate was fed into 2,000 ml of N-methyl-2-pyrrolidone, and 129.0 g of pyromellitic dianhydride was added to this solution at room temperature. Then, the temperature of the resulting solution was gradually elevated to generate carbon dioxide. Thereafter, the generation of carbon dioxide came to an end after the solution was heated at 180° C. for 5 hours, and heating was therefore stopped. This polymer solution was fully washed with water and the obtained polymer was dried. The polymer had an intrinsic viscosity of 0.50 (dl/g). This polymer will be called PIPM hereinafter.

Reference Example 2 (synthesis of polyimide (PHPM))

104.5 Gram of trimethyl hexamethylenediamine (a mixture of 2,2,4- and 2,4,4-isomers) was fed into 2,000 ml of N-methyl-2-pyrrolidone, and the obtained solution was cooled in an ice bath. Thereafter, 144.0 g of pyromellitic dianhydride was added to this solution, and polymerization was carried out in the ice bath for 8 hours. After 148.2 g of acetic anhydride and 114.7 g of pyridine were added to this system, the resulting solution was stirred at 0° C. for 12 hours. This polymer solution was fully washed with water and the obtained polymer was dried. The polymer had an intrinsic viscosity of 0.30. This polymer will be called PHPM hereinafter.

Comparative Example 1

Poly(1,2-ethylene-2,6-naphthalene dicarboxylate) (to be abbreviated as PEN hereinafter) having an intrinsic viscosity of 0.71 was melt-kneaded at a polymer temperature of 290° C. for an average residence time of about 20 minutes, and extruded using a twin-screw extruder having a diameter of 30 mm and two screws rotating in the same direction (PCM30 of Ikegai Ironworks Co., Ltd.). The thus obtained polymer was heated to a temperature of (melting point+30)° C. at a rate of 20° C./min by a differential scanning calorimeter (DSC), and to ensure accuracy, a sample was taken out from the polymer, quenched with dry ice and heated at a rate of 20° C./min again to obtain its glass transition temperature.

The results are shown in Table 1.

Examples 1 to 3

A predetermined amount of PIPM was added to 100 parts of PEN having an intrinsic viscosity of 0.71, and the resulting mixture was melt-kneaded at a polymer temperature of 290° C. for an average residence time of about 20 minutes using a twin-screw extruder having a diameter of 30 mm and two screws rotating in the same direction (PCM30 of Ikegai Ironworks Co., Ltd.) as in Comparative Example 1. The glass transition temperature was obtained in the same manner as in Comparative Example 1.

When PIPM was contained in an amount of 10 wt % of the polymer composition, the glass transition temperature of the polymer composition was increased by 10° C. or more in all of Examples 1 to 3. The results are shown in Table 1. In Example 3, the melting point could not be detected (ND).

Comparative Example 2

ULTEM1000 (of General Electric Corp.) was used in place of PIPM, and melt-kneaded with PEN as in Example 1. Although the glass transition temperature of PEN did rise, an increase in the glass transition temperature was smaller than when PIPM was used.

TABLE 1

|  | Polyalkylene naphthalate/ Polyimide | Proportion of addition (Weight ratio) | Thermal properties (Tg, Tm) <° C.> |
|---|---|---|---|
| Comparative Example 1 | PEN | 100 | 118, 265 |
| Example 1 | PEN/PIPM | 90/10 | 129, 264 |
| Example 2 | PEN/PIPM | 80/20 | 142, 265 |
| Example 3 | PEN/PIPM | 50/50 | 218, ND |
| Comparative Example 2 | PEN/UMTEM1000 | 90/10 | 122, 267 |

Example 4 and Comparative Example 3

10 Parts of PEN having an intrinsic viscosity of 0.71 was added to 90 parts of the above PIPM and the mixture was well kneaded at 310° C. to prepare a polymer. The polymer was extruded from a 0.5 mm-diameter nozzle at 310° C. by a flow tester to obtain a thread-like sample (Example 4). However, PIPM could not be extruded and a thread-like sample could not be obtained from a polymer composed of PIPM alone under the same conditions (Comparative Example 3). That is, the melt viscosity of PIPM was reduced by adding a slight amount of PEN, whereby moldability was improved.

Reference Example 3

The above PEN was melt-kneaded using the above twin-screw extruder having a diameter of 30 mm and two screws rotating in the same direction (PCM30 of Ikegai Ironworks Co., Ltd.) to obtain a 100 μm-thick film. The luminous intensity ($I_0$) of fluorescence from the obtained PEN film was measured in an area not dependent on thickness.

The luminous intensity of fluorescence was measured by comparing the amount of light emission in a fluorescence emission area of 400 to 550 nm (with bandpass of 10 nm) at an excitation wavelength of 350 nm (bandpass of 10 nm) with those of the following Examples using the F-2000 Hitachi Fluorescent Spectrophotometer of Hitachi, Ltd.

Examples 5 to 9

100 Parts of PEN having an intrinsic viscosity of 0.71 and a predetermined amount of PIPM or PHPM were mixed together, and the mixture was melt-kneaded in the same manner as in Comparative Example 3 to obtain a 100 μm-thick film, and the reduction rate of the fluorescence intensity of this film was obtained.

The reduction rate of fluorescence intensity was calculated from the following equation when the luminous intensity of the above Reference Example 3 was represented by $I_0$ and the luminous intensity of Examples by I.

Reduction rate of fluorescence intensity = $(I_0 - I)/I_0 \times 100 (\%)$

The results are shown in Table 2.

TABLE 2

|  | Material to be added | Amount of addition (parts) | Reduction rate of fluorescence intensity (%) |
|---|---|---|---|
| Example 5 | PIPM | 0.1 | 18 |
| Example 6 | PIPM | 1 | 42 |
| Example 7 | PIPM | 5 | 73 |
| Example 8 | PIPM | 20 | 92 |
| Example 9 | PHPM | 5 | 72 |

Examples 10 and 11

A predetermined amount of PIPM was added to 100 parts of polyethylene terephthalate (PET) having an intrinsic viscosity of 0.71. The mixture was melt-kneaded at a polymer temperature of 290° C. for an average residence time of about 20 minutes, and extruded using a twin-screw extruder having a diameter of 30 mm and two screws rotating in the same direction (PCM30 of Ikegal Ironworks Co., Ltd.). The thus obtained polymer was heated to a temperature of (melting point+30)° C. at a rate of 20° C./min by a differential scanning calorimeter (DSC) and a sample was taken out from the polymer, quenched with dry ice and heated at a rate of 20° C./min again to obtain its glass transition temperature. The glass transition temperature was greatly improved when PIPM was added to PET. The results are shown in Table 3.

Comparative Example 3

PET having an intrinsic viscosity of 1.01 was melt-kneaded at a polymer temperature of 290° C. for an average residence time of about 20 minutes using a twin-screw extruder having a diameter of 30 mm and two screws rotating in the same direction (PCM30 of Ikegai Ironworks Co., Ltd.) as in Examples 10 and 11. The glass transition temperature was obtained in the same manner as in Examples 10 and 11.

Comparative Example 4

ULTEM1000 (of General Electric Corp.) was mlet-kneaded in place of PIPM in the same manner as in Examples 10 an 11. As shown in Table 3, an increase in glass transition temperature when ULTEM1000 was added was smaller than when PIPM was added.

TABLE 3

|  | Polyethylene terephthalate/ Polyimide | Proportion of addition | Thermal properties (Tg, Tm) <° C.> |
|---|---|---|---|
| Comparative Example 3 | PET | 100 | 72, 258 |
| Example 10 | PET/PIPM | 90/10 | 88, 255 |
| Example 11 | PET/PIPM | 75/25 | 100, 251 |
| Comparative Example 4 | PET/ULTEM1000 | 90/10 | 81, 255 |

Example 12 and Comparative Example 5

10 Parts of PET having an intrinsic viscosity of 1.01 was added to 90 parts of the above PIPM, and the mixture was well kneaded at 330° C. to prepare a polymer. The polymer was extruded from a 0.5 mm-diameter nozzle by a flow tester to obtain a thread-like sample (Example 12). However, a polymer, to which PET was not added, composed of PIPM alone could not be extruded under the same conditions (Comparative Example 5).

Example 13

20 Parts of PIPM was added to 80 parts of PET having an intrinsic viscosity of 1.01, and the mixture was molten as in Example 10, extruded from the nozzle of the above twin-screw extruder, quenched by cooling water and cut into a chip of about 3 mm in diameter and length by a cutter. The obtained chip had a glass transition temperature of 96° C. The chip was dried with hot air at 160° C. for 5 hours and injection-molded in a mold being cooled with cooling water at 10° C., using the M-100DM injection molding machine of Meiki Seisakusho Co., Ltd., of which a cylinder temperature was set at a temperature of 275° C., to obtain a preform. The preform was a bottomed cylinder having an outer diameter of its cylindrical barrel portion of 22 to 24 mm, a thickness of 3.5 mm and a total length of 150 mm and a substantially amorphous achromatic transparent molded article.

The bottomed preform was stretched in an axial direction in a bottle-like mold at 100 to 130° C. and expanded in a transverse direction with an inert gas having a pressure of 10 to 20 kg/cm$^2$ to mold a bottle having an outer diameter of its barrel portion of 82 mm, a total height of 280 mm and an inner volume of 1,450 to 1,550 ml.

The thus obtained bottle was filled with hot water at 75° C., left to cool at room temperature, and then, measured for its change in volume before and after the filling of hot water. The mouth portion of the bottle was cut out and immersed in hot water heated at 75° C. for 1 minute to measure a change in the inner diameter of the mouth portion before and after this treatment.

Thereafter, the heat resistance of the produced bottle and the glass transition temperature of the polymer of the obtained bottle were obtained. The performance of the obtained bottle is shown in Table 4 below. The amount of PIPM added in the table indicates wt % of PIPM in the whole polymer. The glass transition temperature was improved when PIPM was contained, as compared with when PET was used alone as in the following Comparative Example 6, and heat resistance was greatly improved while volume shrinkage and inner diameter shrinkage factors were reduced. The performance of the obtained bottle is shown in Table 4 below.

Comparative Example 6

PET having an intrinsic viscosity of 1.01 was melt-kneaded in the same manner as in Example 13 and cut into a chip, which was then molded into a bottle. The performance of the obtained bottle is shown in Table 4 below.

TABLE 4

| | Type of poly-imide | Amount of addition (wt %) | Glass transition temperature <° C.> | Volume shrinkage factor (%) | Inner diameter shrinkage factor (%) |
|---|---|---|---|---|---|
| Example 13 | PIPM | 20 | 96 | 0.1 or less | 0.1 or less |
| Comparative Example 6 | — | — | 72 | 2.5 | 0.8 |

Reference Example 3 (synthesis of polyimide (PTDO))

62.524 Grams (0.395 mole) of trimethyl hexamethylene-diamine (mixture of 2,2,4- and 2,4,4-isomers) and 79.146 g (0.395 mole) of 1,12-dodecanediamine were fed to 2,000 ml of N-methyl-2-pyrrolidone in a nitrogen atmosphere. Thereafter, the solution was cooled in an ice bath, and 245.07 g (0.790 mole) of oxydiphthalic acid was added thereto. Subsequently, polymerization was carried out in the ice bath for 8 hours. Then, 240 g of acetic anhydride and 190 g of pyridine were added to this system, and the resulting solution was stirred at room temperature for 12 hours. This polymer solution was fully washed with water and the obtained polymer was dried. The polymer had an intrinsic viscosity of 0.54. This polymer will be called PTDO hereinafter. The glass transition temperature of PTDO, measured by a thermal analysis method to be described later, was 88° C. The crystallinity and melting point of PTDO were not seen.

Reference Example 4 (preparation of PTDO master polymer)

1. Synthesis of AC6I (solvent)

In a nitrogen atmosphere, 498 g of 1,2-cyclohexanedicarboxylic anhydride was added to 800 ml of toluene, and 283 g (1.2 moles based on 1 mole of 1,2-cyclohexanedicarboxylic anhydride) of n-butylamine was added dropwise to this solution. After the toluene was refluxed for 6 hours, it was confirmed that a predetermined amount of water flew out. After the toluene and the excess of the n-butylamine were distilled out, the product (AC4I) represented by the following formula was purified by distillation. This product had a boiling point of 300° C. or higher at normal pressure and 115° C. at a pressure of 0.5 mmHg or less.

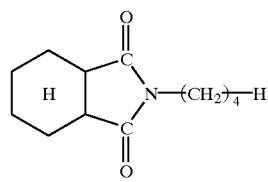

2. Blend of PTDO and PEN

400 Grams of AC6I were added to 200 g of PTDO in a three-necked flask in a nitrogen atmosphere, and the solution was heated to 290° C. while stirred by an anchor-shaped stirring blade to dissolve PTDO in AC6I. When 800 g of PEN was added to the resulting solution, PEN also dissolved in this solution in about 5 minutes and a transparent solution of a composition was obtained. Thereafter, AC6I was completely removed by gradually reducing the pressure to 0.5 mmHg in about 1 minute to prepare a master polymer containing 20 wt % of PTDO.

Examples 14 to 17

The master polymer of PTDO obtained in the above Reference Example 4 was ground and mixed with a PEN chip having an intrinsic viscosity of 0.73. The resulting mixture was melt-kneaded at a polymer temperature of 290° C. for an average residence time of about 20 minutes, and extruded from a T die using a twin-screw extruder having a diameter of 30 mm and two screws rotating in the same direction (PCM30 of Ikegai Ironworks Co., Ltd.) to obtain a 200 μm-thick unstretched film. After the unstretched film was biaxially stretched simultaneously to 3.5×3.5 times at 140° C., it was fixed to a metal frame and heat set at 240° C. for 10 minutes. The thus obtained polymer, unstretched film, and stretched-and-heat-set film were evaluated in accordance with the following methods.

<Thermal Analysis>

The unstretched film was heated to a temperature of (melting point+30)° C. at a rate of 20° C./min by a differential scanning calorimeter (DSC). To ensure accuracy, a sample was taken out from the film, quenched with dry ice and heated at a rate of 20° C./min again to obtain its glass transition temperature (Tg), crystallization temperature (Tc) and melting point (Tm).

<Melt viscosity>

The melt viscosity was measured using a flow tester at a shear rate of 1,000 sec$^{-1}$ at 300° C.

<Measurement of fluorescence>

The luminous intensity of fluorescence was measured by comparing the amount of light in a fluorescence emission area of 400 to 550 nm (with bandpass of 10 nm) at an excitation wavelength of 350 nm (with bandpass of 10 nm) with those of Examples, using an unstretched film and the F-2000 Hitachi Fluorescent Spectrophotometer of Hitachi, Ltd.

The reduction rate of fluorescent intensity was calculated from the following equation when the luminous intensity of Comparative Example was represented by $I_0$ and the luminous intensity of Examples by I.

Reduction rate of fluorescent intensity=$(I_0-I)/I_0 \times 100(\%)$

<Weatherability>

The obtained unstretched film was exposed to ultraviolet light by a xenon weather meter according to JIS L0842 (63° C., in the rain), and the haze of the film caused by the deterioration of the surface was measured by a haze meter.

<Delamination resistance>

The above-described stretched-and-heat-set film was used as a film for the measurement of delamination resistance. Two of the film to be folded in MD (4 cm in MD and 5 cm in TD) and two of the film to be folded in TD (5 cm in MD and 4 cm in TD) were prepared (four films in total) for the above measurement and placed in a desiccator (humidity of 50%, 25° C.) for 3 days to adjust the humidity of each of the films. The films to be folded in MD were folded in a direction parallel to MD and the films to be folded in TD were folded in a direction parallel to TD. Each of the folded films was pressed at a pressure of 10 kgf/cm$^2$ for 20 seconds, and further folded out and pressed at 4 kgf/cm$^2$ for 20 seconds. The width of a stripe formed in each of the folds at 5 sites spaced at equal intervals was measured (total of 20 sites). The average value of the widths measured at the 20 sites is taken as the width of delamination. It is defined that the film is more easily delaminated as the width of delamination is larger.

It is understood from Table 5 that when a predetermined amount of PTDO is blended as shown in Table 5, the glass transition temperature (Tg) of the blend polymer lowers according to the content of PTDO and the blend polymer is made compatible with PEN. It is further understood that when the content of PTDO is increased, the crystallization temperature (Tc) peak becomes large and crystallization is promoted, whereby the peak area of the melting point (Tm) also becomes large. Further, the melt viscosity reduces according to the content of PTDO, thereby improving the moldability.

Comparative Example 7

The glass transition temperature and melt viscosity of PEN having an intrinsic viscosity of 0.73 were measured in the same manner as in Examples.

TABLE 5

|  | Content of PTDO (wt %/polymer) | Tg (° C.) | Tc (° C.)(J/g)* | Tm (° C.)(J/g)* | Melt viscosity (poise) |
|---|---|---|---|---|---|
| Comparative Example 7 | 0 | 118 | — (0) | 265 (+3.30) | 3700 |
| Example 14 | 1 | 117 | 223.3 (−1.76) | 265 (+7.96) | 3480 |
| Example 15 | 3 | 116 | 221.6 (−6.62) | 265 (+16.81) | 3360 |
| Example 16 | 5 | 116 | 222.4 (−9.99) | 265 (+18.16) | 3160 |
| Example 17 | 10 | 115 | 222.0 (−14.61) | 265 (+21.18) | 2600 |

*Parenthesized figures indicate peak area (+ heat absorption, − heat generation)

Further, the fluorescence emission of the PEN containing PTDO reduced. It was also found that because the haze after 150 hours of exposure to light was smaller than that of Comparative Example, optical deterioration resistance reduced and weatherability improved. It was also found that the stretched-and-heat-set film had improved delamination resistance with a narrower delamination width. These results are shown in Table 6 below.

TABLE 6

|  | Reduction rate of fluorescence % | Haze after 150 hours | Delamination width (μm) |
|---|---|---|---|
| Comparative Example 7 | 0 | 7.0 | 50 |
| Example 14 | 10 | 5.8 | 45 |
| Example 16 | 33 | 4.0 | 20 |

Examples 18 to 20

Polyimide was prepared in the same manner as in Example 14 except that the acid component was changed to a component shown in Table 7 below, and its glass transition temperature (Tg) was measured. When the polyimide was blended with PEN (PEN/polyimide weight ratio=80/20), they became compatible with each other completely. When the glass transition temperature of the blend polymer was measured in the same manner as in Example 14, Tg of all the blend polymer was lower than that of PEN. The blend polymer had reduced melt viscosity and fluorescence and improved crystallinity, weatherability and delamination resistance.

17

TABLE 7

| | Acid anhydride | Intrinsic viscosity (dl/g) | Tg of polyimide (° C.) | Blend (20%) with PEN Tg(° C.) |
|---|---|---|---|---|
| Example 18 | PMDA | 0.38 | 105.6 | 114 |
| Example 19 | BTDA | 0.32 | 103.5 | 114 |
| Example 20 | S-BPDA | 0.31 | 96.5 | 112 |

PMDA: Pyrometallic dianhydride
BTDA: 3,3,4,4-benzophenonetetracarboxylic dianhydride
S-BPDA: 3,3,4,4-bisphenyltetracarboxylic dianhydride

Examples 21 and 22

Polyimide was prepared in the same manner as in Example 14 except that oxydiphthalic acid was used as an acid component and the amine component was changed as shown in Table 8 below, and its glass transition temperature (Tg) was measured. When this polyimide was blended with PEN (PEN/polyimide weight ratio=80/20), they became compatible with each other completely. When the glass transition temperature of the blend polymer was measured in the same manner as in Example 14, it was lower than that of PEN. The blend polymer had reduced melt viscosity and fluorescence and improved crystallinity, weatherability and delamination resistance.

TABLE 8

| | Acid anhydride | Intrinsic viscosity (dl/g) | Tg of polyimide (° C.) | Blend (20%) with PEN Tg (° C.) |
|---|---|---|---|---|
| Example 21 | TMHMDA | 0.38 | 105.2 | 114.3 |
| Example 22 | TMHMDA/HMDA (1/1) | 0.48 | 108.7 | 115.6 |

TMHMDA: 2,2,4- and 2,4,4-trimethyl hexamethylenediamine
HMDA: 1,6-hexamethylenediamine

Comparative Examples 8 and 9

PEN was mixed with a chip of the ULTEM1000 amorphous polyimide (of General Electric Corp, Tg of 220° C.) which had a higher glass transition temperature than that of PEN. The mixture was melt-kneaded by a twin-screw extruder in the same manner as in Examples. The obtained polymer was measured for its thermal analysis, melt viscosity and delamination resistance. It was found that when the amount of the ULTEM1000 blend increased, crystallinity lowered with a smaller melting peak area (Table 9). When the content of the ULTEM1000 increased, the melt viscosity increased, moldability lowered and the delamination resistance did not improve with a large delamination width.

TABLE 9

| | Content (%) | Tg (° C.) | Tc (° C.) | Tm (° C.)* | Melt viscosity (poise) | Delamination width (μm) |
|---|---|---|---|---|---|---|
| Comparative Example 7 | 0 | 118 | — | 265 (1) | 3700 | 50 |
| Comparative Example 8 | 5 | 120 | 228.8 | 265 (0.83) | 6000 | 50 |
| Comparative Example 9 | 10 | 123 | 234.4 | 265 (0.67) | 8200 | 50 |

*Parenthesized figures indicate peak area relative values

18

What is claimed is:

1. A thermoplastic resin composition which comprises (a) an aromatic polyester containing an aromatic dicarboxylic acid as a main acid component and an aliphatic glycol having 2 to 8 carbon atoms as a main diol component and (b) an amorphous polyimide comprising a recurring unit represented by the following formula (1):

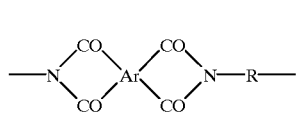

(1)

wherein Ar is an aromatic group having 6 to 15 carbon atoms and

R is at least one substituent selected from the group consisting of (1) an aliphatic group having 6 to 30 carbon atoms and (2) an alicyclic group having 4 to 30 carbon atoms or R is (3) a combination of greater than 50 mol % of at least one of said aliphatic group or said alicyclic group and less than 50 mole % of an aliphatic group having 5 or less carbon atoms, said mole % being based on the total of R in the formula (1).

and which contains 5 to 99.95 wt % of the aromatic polyester (a) and 0.05 to 95 wt % of the amorphous polyimide (b), based on the total weight of the aromatic polyester (a) and the amorphous polyimide (b).

2. The resin composition of claim 1, wherein the aromatic dicarboxylic acid as a main acid component of the aromatic polyester (a) is at least one member selected from the group consisting of terephthalic acid and 2,6-naphthalenedicarboxylic acid.

3. The resin composition of claim 1, wherein the aliphatic glycol having 2 to 8 carbon atoms as a main diol component of the aromatic polyester (a) is a glycol represented by the following formula (2):

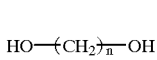

(2)

wherein n is a number of 2 to 8.

4. The resin composition of claim 1, wherein the aromatic polyester (a) is polyethylene-2,6-naphthalene dicarboxylate.

5. The resin composition of claim 1, wherein in the above formula (1) representing the recurring unit of the amorphous polyimide, (b) Ar is an aromatic group selected from the group consisting of

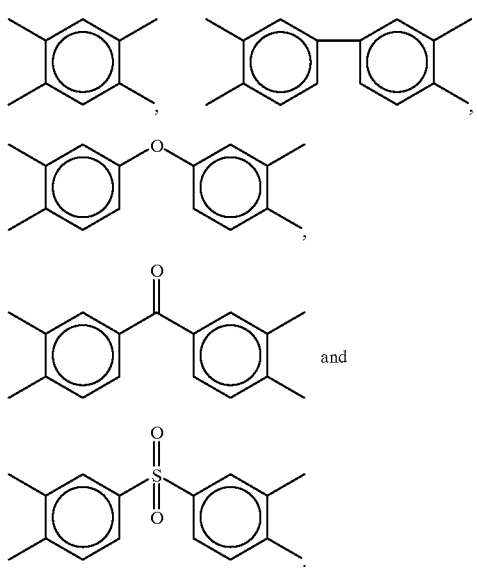
and
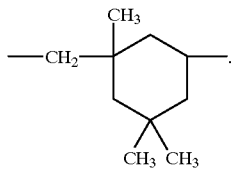

6. The resin composition of claim 1, wherein in the above formula (1) representing the recurring unit of the amorphous polyimide, (b) R is an aliphatic group having 6 to 12 carbon atoms or an alicyclic group having 6 to 12 carbon atoms.

7. The resin composition of claim 1, wherein in the above formula (1) representing the recurring unit of the amorphous polyimide, (b) R is at least one member selected from the group consisting of $-(CH_2)_m-$ (wherein m is 6 to 12, 2,2,4-trimethylhexamethylene, 2,4,4-trimethylhexamethylene and $CH_3$

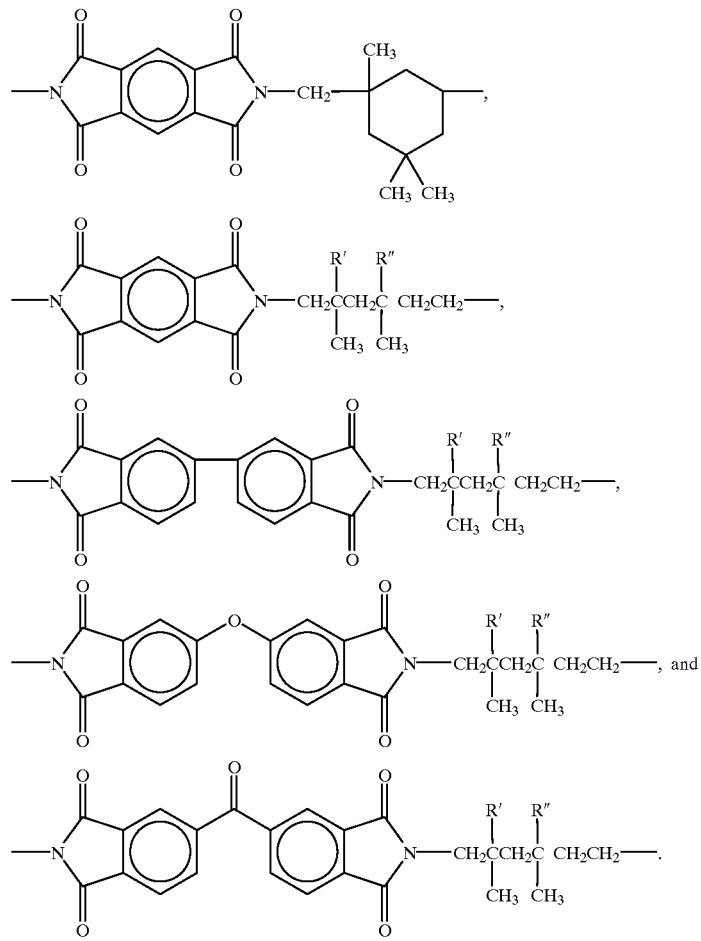

8. The resin composition of claim 1, wherein the recurring unit represented by the above formula (1) is at least one selected from the group consisting of:

wherein one of R' and R" is a hydrogen atom and the other is a methyl group.

9. The resin composition of claim 1, wherein the amorphous polyimide (b) consists essentially of recurring units represented by the following formula:

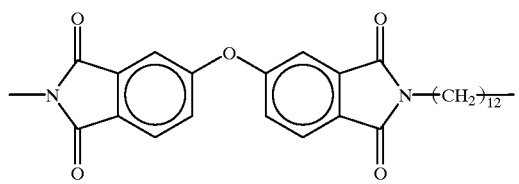

wherein one of
R' and R" is a hydrogen atom and the other is a methyl group, and recurring units represented by the following formula:

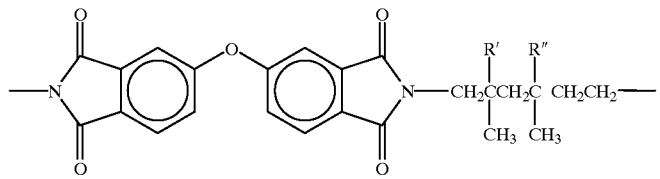

10. The resin composition of claim 1, which exhibits one peak derived from the glass transition temperature when measured by a differential scanning calorimeter (DSC) at a temperature elevation rate of 20° C./min.

11. The resin composition of claim 1, which comprises the aromatic polyester (a) in an amount of 40 to 95 wt % and the amorphous polyimide (b) in an amount of 5 to 60 wt %, based on the total amount of the aromatic polyester (a) and the amorphous polyimide (b).

12. The resin composition of claim 1, which comprises the aromatic polyester (a) in an amount of 50 to 90 wt % and the amorphous polyimide (b) in an amount of 10 to 50 wt %, based on the total amount of the aromatic polyester (a) and the amorphous polyimide (b).

13. The resin composition of claim 1, wherein the aromatic polyester (a) comprises 2, 6-naphthalenedicarboxylic acid as a main acid component and ethylene glycol as a main diol component and is present in an amount of 80 to 99.95 wt %, and the amorphous polyimide (b) is present in an amount of 0.05 to 20 wt %, based on the total weight of the aromatic polyester (a) and the amorphous polyimide (b).

14. A thermoplastic resin composition which comprises (a) an aromatic polyester containing an aromatic dicarboxylic acid as a main acid component and an aliphatic glycol having 2 to 8 carbon atoms as a main diol component and (b) an amorphous polyirnide comprising a recurring unit represented by the following formula (1):

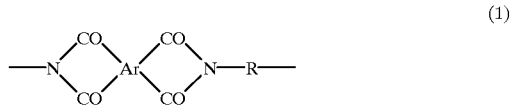

(1)

wherein Ar is an aromatic group having 6 to 15 carbon atoms and R is a combination of greater than 50 mol % of a straight chain aliphatic group having 6 to 30 carbon atoms and less than 50 mol % of an aliphatic group other than said straight chain aliphatic group said mole % being based on the total of R in the formula (1), and which contains 5 to 99.95 wt % of the aromatic polyester (a) and 0.05 to 95 wt % of the amorphous polyimide (b), based on the total weight of the aromatic polyester (a) and the amorphous polyimide (b).

15. A thermoplastic resin composition which comprises (a) an aromatic polyester containing an aromatic dicarboxylic acid as a main acid component and an aliphatic glycol having 2 to 8 carbon atoms as a main diol component and (b) an amorphous polyimide comprising a recurring unit represented by the following formula (1):

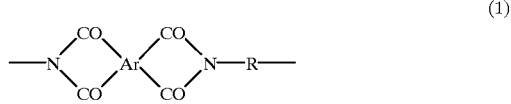

(1)

wherein Ar is an aromatic group having 6 to 15 carbon atoms and R is a combination of a straight chain aliphatic group having 6 to 30 carbon atoms and an alicyclic group having 4 to 30 carbon atoms,
and which contains 5 to 99.95 wt % of the aromatic polyester (a) and 0.05 to 95 wt % of the amorphous polyimide (b), based on the total weight of the aromatic polyester (a) and the amorphous polymide (b).

* * * * *